June 16, 1964
B. M. HORTON
3,137,464
FLUID SYSTEM FOR AIRCRAFT CONTROL
Original Filed Sept. 19, 1960
3 Sheets-Sheet 1
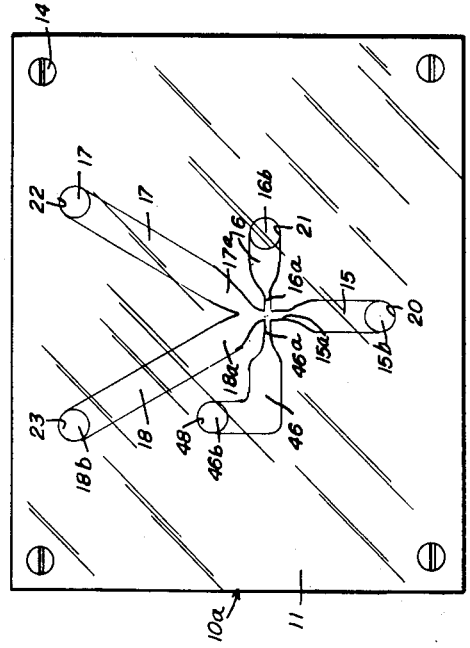
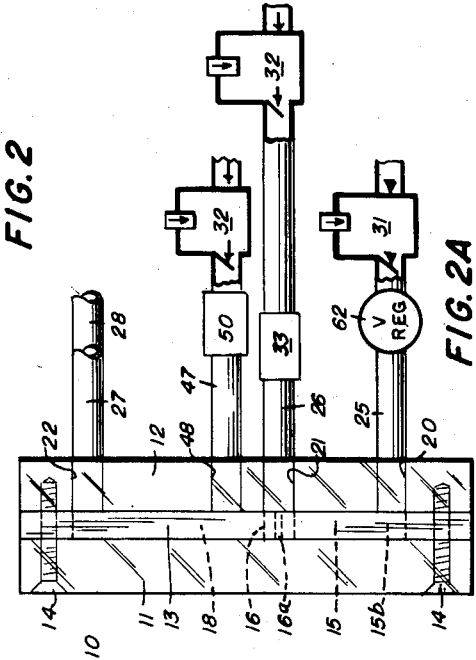
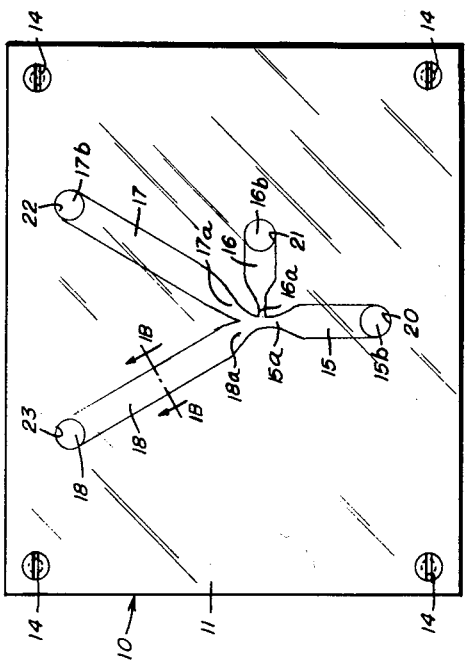
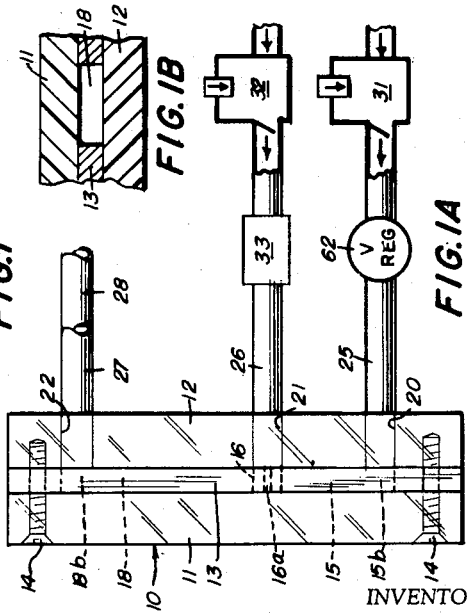
INVENTOR
BILLY M. HORTON
BY June 16, 1964 B. M. HORTON 3,137,464
FLUID SYSTEM FOR AIRCRAFT CONTROL
Original Filed Sept. 19, 1960 3 Sheets-Sheet 2
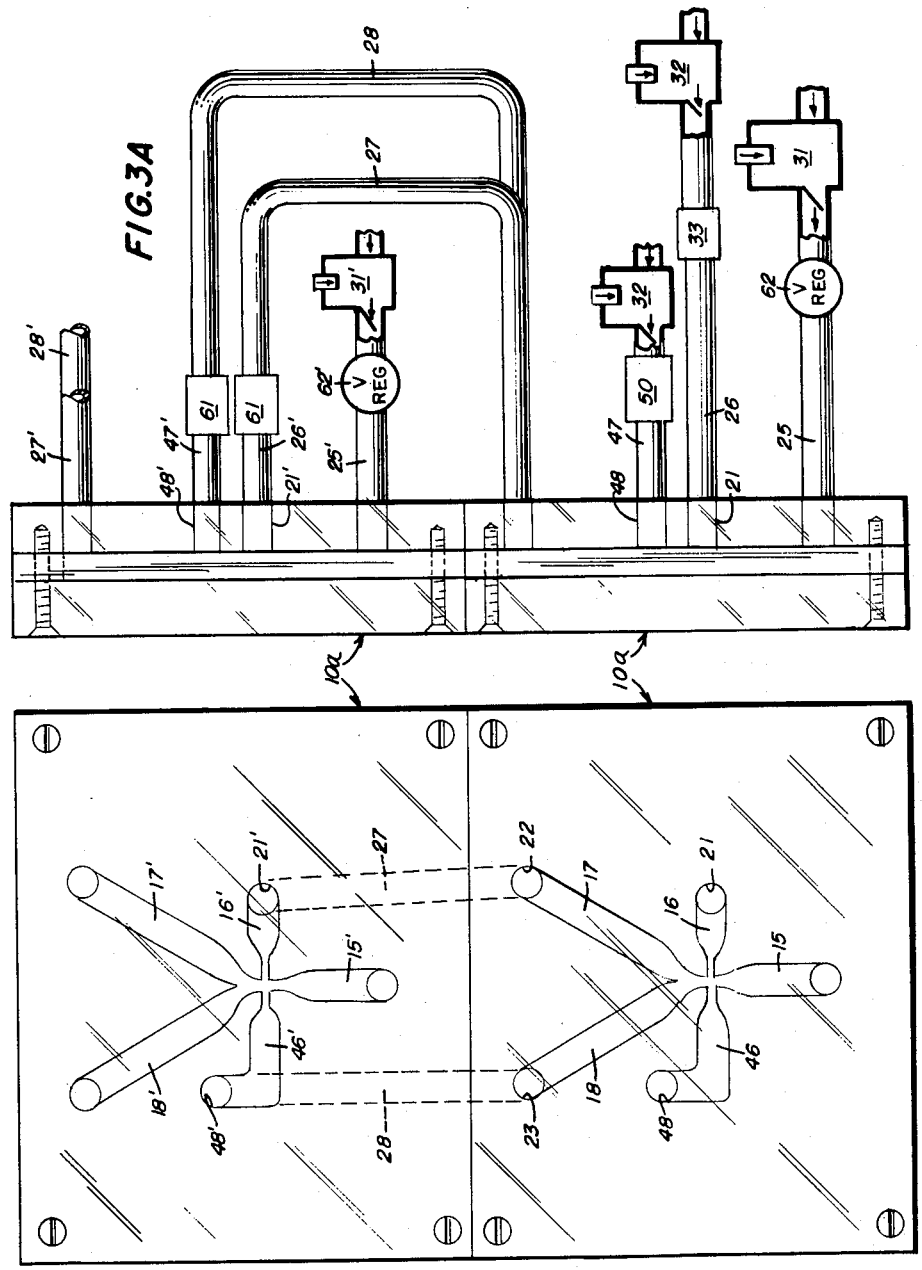
INVENTOR
BILLY M. HORTON
BY Harry M. Saragovitz June 16, 1964  B. M. HORTON  3,137,464
FLUID SYSTEM FOR AIRCRAFT CONTROL
Original Filed Sept. 19, 1960  3 Sheets-Sheet 3

INVENTOR
BILLY M. HORTON

BY

United States Patent Office 3,137,464
Patented June 16, 1964

3,137,464
FLUID SYSTEM FOR AIRCRAFT CONTROL
Billy M. Horton, Rock Creek Hills, Md.
(9712 Kensington Parkway, Kensington, Md.)
Original application Sept. 19, 1960, Ser. No. 51,896, now Patent No. 3,122,165. Divided and this application Nov. 20, 1962, Ser. No. 258,364
9 Claims. (Cl. 244—78)
(Granted under Title 35, U.S. Code (1952), sec. 266)

This application is a divisional application of my copending application Serial No. 51,896, filed September 19, 1960, now Patent No. 3,122,165, for Fluid-Operated System. Serial No. 51,896 is a continuation-in-part of my application Serial No. 848,878, filed October 26, 1959, now abandoned, for Fliud Amplifier System.

The invention described herein may be manufactured and used by or for the Government for governmental purpose without the payment to me or any royalty thereon.

This invention relates to a fluid-operated system which utilizes the flow of a fluid so that the system performs functions which are analogous to functions now being performed by electronic components and systems, and relates more particularly to such a system employed for aircraft orientation control.

Electronic systems and components are capable of performing such functions as detecting and amplifying a signal. However, it is also desirable that systems other than electronic perform the same or analogous functions without requiring a source of electrical energy or delicate electronic components. While known mechanical systems will perform functions analogous to functions performed by electronic systems, these systems require large numbers of moving parts. Failure in any part usually results in improper operation or failure of the system.

Broadly, therefore, it is an object of this invention to provide a fluid-operated system which performs functions analogous to functions performed by existing electronic systems such as a system for aircraft control in this disclosure.

More specifically, it is an object of this invention to utilize a fluid-operated system having no moving parts to control the orientation of a vehicle relative to one of its axes.

It is a further object of this invention to provide a fluid-operated system for sensing the deviation of a vehicle from a desired orientation relative to one of its axes and to establish a control function for re-establishing the desired orientation.

According to this invention the energy of a fluid stream is utilized in a unique system which has no moving parts. The system utilizes a pressurized fluid stream in a manner such that the fluid performs similar functions to those performed by electrons in existing electronic systems. Using the principles of this invention such functions as multiplication and amplifictaion can be performed.

More specifically, the present invention relates to fluid amplifiers employing no moving parts in which amplification depends upon magnitude of deflection of a stream of fluid resulting from controlled fluid pressure gradient provided transversely of the direction of flow of the fluid stream.

In fluid amplifiers of the type with which the present invention is concerned, a fluid stream, hereinafter referred to as the power stream, issues from a nozzle or orifice constructed such that the power stream is well defined in space. In a specific example of one type of fluid amplifier, a control fluid stream is directed toward the power stream in a direction generally perpendicular thereto, to provide a differential pressure or pressure gradient across the power stream. The apparatus is provided with at least two outlet or fluid recovery apertures or passages, facing the power stream, and the recovery apertures or passages are arranged such that when the power stream is undeflected by the control stream, all of the fluid of the power stream is directed to a first of the outlet passages. The first outlet passage is returned to a sump, and a load device is associated with a second of the outlet passages.

The control stream being directed generally transversely of the power stream, an interaction occurs between the two streams, resulting in deflection of the power stream to an extent, that is, through an angle, which is related to the energy and momentum of the control stream. Deflection of the power stream results in delivery of a portion of the power stream to the second outlet passage where some of the kinetic energy of the power stream entering the second outlet passage may be recovered, or where the fluid so directed may be delivered to a utilization device. It has been found that a low energy control stream can deflect a well-defined, high energy power stream to the extent required to cause a substantial portion of the power stream to be delivered to the second output passage, and that the integrity, i.e., the well defined character, of the power stream is retained sufficiently after interaction of the two streams that the total energy or change in total energy delivered to the second outlet passage can be greater than the energy or change in energy required to accomplish this deflection. Thus, since the changes in energy at the load device produced by deflection of the stream are greater than the changes in energy required to produce the deflection, the apparatus is capable of amplification, and can produce a power gain. The gain achievable with a particular system is, to a degree, dependent upon the spacing between the outlet passages and the nozzle or nozzles herein after called the power nozzle, from which the power stream issues. If the outlet passages are located close to the power nozzle then relatively large angular deflections of the power stream are required to produce any substantial change in the differential quantity of fluid delivered to the outlet passage apertures. More specifically, the change in relative energies delivered to the outlet passages is a function of the angle through which the power stream is deflected. If the outlet passages are considered to be located on an arc of a circle, the deflection is equal to the angle of deflection in radians times the radius of the circle. This radius is equal to the distance between the point of interaction of the two streams and the outlet apertures or passages. Ideally, therefore, the outlet apertures or passages should be spaced as far as possible from the point of interaction of the two streams, so as to minimize the angle through which it is required to deflect the power stream in order to produce a predetermined change in energy at the outlet passages. However, the distance that the outlet passages may be located from the point of interaction of the two streams is limited by the amount of spread and loss of integrity of the power stream as a function of distance. When two gas jets interact in a gaseous atmosphere, the power stream begins to lose its integrity at a relatively short distance from the point of interaction of the streams, and this causes a loss of kinetic energy which limits the power gain of the amplifier.

In accordance with another feature of the present invention, the interacting streams can be confined in a plane parallel to the plane of deflection of the power stream, hereinafter called the deflection plane. It has been found that by preventing expansion of the fluid stream in a direction perpendicular to, or normal to the deflection plane, hereinafter called the N direction, the distance over which the power stream retains its integrity is greatly increased. In consequence, the outlet passages may be placed at a considerable distance from the point of interaction of the streams and therefore the angle through which the power stream must be deflected to achieve a predetermined change in power at one of the output passages is greatly decreased; and the gain of the system is proportionately increased. Specifically, it has been found that by confining the stream to the deflection plane, i.e., by preventing spreading in the N direction, the outlet apertures or passages may be displaced distances from the nozzle which are much greater than the width of the power nozzle without serious loss of integrity of the power stream and without a serious loss of energy due to degradation or spreading of the power stream.

Another feature of the invention is to employ a V-shaped divider between the two outlet passages, so that the apex of the V presents substantially a line division between the two outlet passages. Thereby the amount of deflection required to switch energy from one passage to another is minimized. Further by appropriately shaping the divider, and/or choosing the angles of the side walls of the divider, it produces a minimum of interference with the flow patterns established in the apparatus. Also if the power stream is normally directed in its undeflected position directly toward the apex of the divider, so that the mass flow divides equally between the two output passages, gain can be further enhanced. In such an apparatus, the load device may be connected across the two outlet passages so as to respond to the differential output from the passages. When the power stream is deflected, the power applied to one outlet passage is subtracted from the power supplied to the other outlet passage, and therefore has a two-fold or push pull effect upon the energy delivered to the load device. Employing all of the techniques described above, single stage gains of greater than 60 are in some cases achievable.

It has been stated herein above that the efficiency of the present invention depends upon maintaining the integrity of the power stream through sufficiently large angles of deflection that the power delivered to a load device on deflection of the power stream is greater than the power required to produce this deflection.

Loss of integrity of the stream, in a properly designed unit is primarily a spreading and slowing of the stream, and in order to understand the effects of stream spreading on the gain of the system, two factors must be considered. One factor to be considered is the type of gain which the apparatus is attempting to achieve and the second factor is the type of stream or jet employed.

There are two well-recognized types of jet system, i.e., the "free jet" and the "submerged jet." In the case of a submerged jet, such as an air jet in an air atmosphere, the viscous drag of the surrounding medium on the submerged stream has an appreciable effect upon the stream which slows down the sides of the stream and produces a non-uniform total pressure there across. Maximum pressure of the stream is usually found in a relatively narrow region along its longitudinal axis, and in consequence, if it is desired to produce a pressure amplifier, the outlet apertures or passages are constructed to sense a narrow region at the center of the stream so that small deflection angles produce large changes in the pressure of the portions of the power stream impinging on each aperture. A second type of amplification is mass flow amplification, wherein the outlet passages of an amplifier are constructed to accumulate all of the fluid in the power stream, or entrained with the power stream. A third type of amplifier is a power amplifier and this unit employs an outlet passage intermediate in size between the passages employed in the two prior cases. The size of the outlet passages for the power amplifier is such that the product of pressure and volume flow is maximized. The load device with which an amplifier is to be employed takes various forms, which normally determines the type of amplification employed. A mechanical load for performing work usually requires a power amplifier. If the output fluid of a unit is to be employed to drive a second diaphragm-actuated valve or a liquid amplifier stage in cascade, then pressure amplification may be required. Mass flow amplification is employed where a great volume of flow is desired and a small pressure can be tolerated.

The spreading of a submerged stream or jet in a fluid amplifier is accompanied by reduction in the available output energy in the stream. With respect to pressure amplification, spreading of the stream is accompanied by a loss of pressure along the sides of the stream due to entrainment of ambient fluid which is initially substantially at rest, thereby reducing the average pressure across the stream. In a mass flow unit, since one is merely collecting all of the fluid in the stream, spreading of the stream does not affect the quantity of fluid collected but spreading of the stream does in some cases produce contamination of the fluid stream. Therefore, in the submerged jet unit, it is important to prevent spreading to whatever extent possible. Obviously spreading of the power stream in the direction of deflection cannot be entirely prevented since room must be allowed for deflection of the power stream but, as indicated above, prevention of spreading in the N direction, which is perpendicular to or normal to the deflection plane, is possible and results in a considerable increase in efficiency and achievable gain in a given unit over that achievable in a unit which does not prevent spreading in the N direction.

The aforesaid factors, which are of great importance in a submerged jet unit, do not have a great effect upon the operation of a free jet system. In a perfect free jet system the effects of viscous drag of the ambient fluid are negligible and the pressure profile of the free jet is uniform. However, a perfect "free jet" is not obtainable in practice and the pressure across the jet is accordingly not absolutely uniform.

Prevention of spreading of the power stream in the N direction, i.e., spreading in a direction normal to the deflection plane can be accomplished by providing top and bottom walls extending parallel to the direction of deflection, and appropriately spaced to permit use of a power stream of the desired size. These walls, however, introduce viscous losses into the system since the fluid adjacent to the walls is at rest and the power jet must provide the energy lost through increased shearing and possibly turbulence between the moving and stationary fluid. Consequently, limitations exist on depths of the unit in the N direction, and more specifically the quantity of the flowing fluid affected by the walls must be small compared to the total flowing fluid in the power stream. In order to minimize this ratio, that is, to make the quantity of fluid affected by the confining top and bottom walls small compared with the total fluid in the stream, the amplifier may be made thick in the N direction compared with the width of the power nozzle.

A limiting factor on the thickness of the unit in the N direction is the fact that if the unit is made too thick the input signal employed to modulate or alter the power stream may have different effects upon different portions of the power stream. If the various portions of the stream do not control the fluid in the power stream in time coincidence, then the ability of the amplifier to respond to rapidly changing control signals is impaired. This effect becomes serious when the amplifier is made thick in the N direction.

This difficulty can be largely overcome by a type of geometry, based on circular symmetry, which has the advantage that top and bottom plate losses are eliminated. Specifically such a design is a toroidal configuration in which the power nozzle is a complete circle surrounded by toroidally-shaped outlet passages. Specifically, the toroidal unit is a figure of revolution of the planar type of amplifier taken about an axis lying in the deflection plane. In a system of this type, the top and bottom walls no longer exist since the device closes upon itself. Spreading of the jet in the N direction in a unit of this type is substantially prevented by the fact that each incremental portion of the power stream is adjacent to fluid on both sides flowing in substantially the same direction. This arrangement provides a unit having losses theoretically corresponding to an infinite displacement between top and bottom plates while retaining the benefits resulting from confining the jet. An apparatus of this type also eliminates the undesired effects, appearing in a planar unit having a large dimension in the N direction, which arise from the fact that the input control signal may arrive at different times at different locations along the power stream. In a toroidal system, the control fluid may be fed to the control nozzle through a manifold which has substantially equal fluid path lengths from the input passage to all portions of the power stream.

A typical single stage amplifier, whether of the toroidal or planar type, or of a type having other configurations, may comprise a power nozzle extending through an end wall of a chamber defined by the end wall and two outwardly diverging side walls, hereinafter referred to as the left and right walls. A V-shaped or aerodynamically streamlined divider is disposed at a predetermined distance from the end wall, the apex of the divider being located along the center line of the nozzle with its sides generally parallel to the left and right side walls of the chamber. The regions between the divider and the left and right side walls define left and right outlet passages respectively. One or more left control nozzles extending through the left wall, or one or more right control nozzles, or a combination of right and left control nozzles are provided, each control nozzle being directed transversely to the power nozzle.

In operation, fluid under pressure is supplied to the power nozzle and a well defined fluid stream, the power stream issues in to the chamber. Control signals in the form of changes in pressure or flow rate are developed at the control nozzles and the control streams issuing from or flowing into these nozzles produce deflection of the power stream in one direction or the other depending upon whether the signal is in the form of increased or decreased pressures, or flow rates, respectively. The amplifier described immediately above is capable of performance as any of several broad classes of fluid amplifier units. Two of these classes are:

(I) Those in which there are two or more streams which interact in such a way that one or more of these streams deflect another stream with little or no interaction between the side walls of the chamber in which the streams interact, and the streams themselves. In such an amplifier or computer fluid element, the detailed contours of the side walls of the chamber in which the streams interact is of secondary importance to the interacting forces between the streams themselves. Although the side walls can be used to contain fluid in the interacting chamber, and thus make it possible to have the streams interact in a region at some desired pressure, the side walls are placed in such a position that they are somewhat remote from the high velocity portions of the interacting streams. Under these conditions the flow pattern within the interacting chamber depends primarily upon the size, speed and the direction of the streams and upon the density, viscosity, compressibility and other properties of the fluids in the streams. In the case of interacting free jets, i.e., those in which streams of fluid impinge upon one another with no interaction between the streams and the side walls, and with no forces from fluids around the streams, momentum must be conserved. This condition of momentum conservation can be approximated by interacting streams of water in air, since the viscosity of air is much lower than the viscosity of water, and since water is much more dense than air. An even better approximation to the condition of momentum conservation by interacting free jets is provided by the case of interacting jets of liquid mercury in vacuum.

(II) The second broad class of fluid amplifier and computer elements comprises those amplifier or computer elements in which two or more streams interact in such a way that the resulting flow patterns and pressure distribution within the chamber are greatly affected by the details of the design of the chamber walls. The effect of side wall configuration on the flow patterns and pressure distribution which can be achieved with single or multiple streams depends on: the relation between width of the power nozzle and of the interacting chamber near the power nozzle; the angle that the side walls make with respect to the center line of the power stream; the length of the side wall (when a divider is not used); the spacing between the power nozzle and the flow divider (if used); and the density, viscosity, compressibility and uniformity of the fluid. It also depends to some extent on the thickness of the amplifying or computing element. Amplifying and computing devices utilizing boundary layer effects, i.e., effects which depend upon details of side walls configuration can be further subdivided into three categories:

(a) Boundary layer elements in which there is no appreciable "lock on" effect. Such a unit has a power gain which can be increased by boundary layer effects, but these effects are not dominant;

(b) Boundary layer units in which "lock on" effects are dominant and are sufficient to maintain the power stream in a particular flow pattern thru the action of the pressure distribution arising from boundary layer effects, and requiring no additional streams other than the power stream to maintain that flow pattern, but having a flow pattern which can be changed to a new stable flow pattern either by the supplying or removal of fluid thru one or more of the control nozzles, or by altering the pressures at one or more of the output apertures;

(c) Boundary layer units in which the flow pattern can be maintained thru the action of the power stream alone without the use of any other stream, which flow pattern can be modified by the supplying or removal of fluid thru the control nozzles, but which units maintain certain parts of the power stream flow pattern, including "lock on" to the side wall, even though the pressure distribution at the output apertures is modified.

In order to understand more fully the reasons for the lock-on phenomena, attention is called to the co-pending patent application of Bowles and Warren, Serial No. 58,188, filed October 19, 1960, portions of the discussions of which are reproduced herewith for the purpose of clarity of the present discussion only. The lock-on phenomena is due to a boundary layer effect existing between the stream and a side wall. Assume initially that the fluid stream is issuing from the main nozzle and is directed toward the apex of the divider. The fluid issuing from the orifice, in passing through the chamber, entrains fluid in the chamber and remove this fluid therefrom. If the fluid stream is slightly closer to, for instance, the left wall than the right wall, it is more effective in removing the fluid in the region between the stream and the left wall than it is in removing fluid between the stream and the right wall since the former region is smaller. Therefore the pressure in the left region between the left wall and stream is lower than the pressure in the right region of the chamber and a differential pressure is set up across the jet tending to deflect it towards the left wall. As the stream is deflected further toward the left wall, it becomes even more efficient in extraining air in the left region and the pressure in this region is further reduced. This action is self-reinforcing and results in the fluid stream becoming deflected toward the left wall and entering the left outlet passage. The stream intersects the left wall at a predetermined distance downstream from the outlet of the main orifice; this point being normally referred to as the point of attachment. This phenomena is referred to as boundary layer lock-on. The operation of this type of apparatus may be completely asymmetrical in that if the stream had initially been slightly deflected toward the right wall rather than the left wall, boundary layer lock-on would have occurred against the right wall.

Continuing the discussion of the three categories of the second class of fluid amplifying elements, the boundary layer unit type (a) above utilizes a combination of boundary layer effects and momentum interaction between streams in order to achieve a power gain which is enhanced by the boundary layer effects, but since boundary layer effects in type (a) are not dominant, the power stream does not of itself remain locked to the side wall. The power stream remains diverted from its initial direction only if there is a continuing flow out of, or into, one or more of the control nozzles. Boundary layer unit type (b) has a sufficient "lock on" effect that the power stream continues to flow entirely out one aperture in the absence of any inflow or outflow signal from the control nozzles. A boundary layer unit type (b) can be made as a bisable, tristable, or multistable unit, but it can be dislodged from one of its stable states by fluid flowing out of or into a control nozzle or by blocking the output passage connected to the aperture receiving the major portion of the power stream. Boundary layer units type (c) have a very strong tendency to maintain the direction of flow of the power stream thru the interacting chamber, this tendency being so strong that complete blockage of the passage connected to one of the output apertures toward which the power stream is directed does not dislodge the power stream from its "locked on" condition. Boundary layer units type (c) are therefore memory units which are virtually insensitive to positive loading conditions at their output passages.

To give a specific example: boundary layer effects have been found to influence the performance of a fluid amplifier element if it is made as follows: the width of the interacting chamber at the point where the power nozzle issues its stream is two to three times the width, W, of the power nozzle, i.e., the chamber width at this point is 3W; and the side walls of the chamber diverge so that each side wall makes a 12° angle with the center line of the power stream. In a unit made in this way, a spacing between the power nozzle and the center divider equal to two power nozzle widths 2W will exhibit increased gain because of boundary layer effects, but the stream will not remain locked on either side. This unit with a divider spacing of 2W is a boundary layer unit type (a) which if the spacing is less than 2W an amplifier of the first class, i.e., a proportional amplifier results. If the divider is spaced more than three power nozzle widths, 3W, but less than eight power nozzle widths, 8W, from the power nozzle, then the power stream remains locked onto one of the chamber walls and is a boundary layer type (b). Complete blockage of the output passage of such a unit causes the power stream to lock to a new flow pattern. A boundary layer unit having a divider which is spaced more than twelve power nozzle widths, 12W, from the power nozzle remains "locked on" to a chamber wall even though there is complete blockage of the passage connected to the aperture toward which the power stream is directed, and thus it is a boundary layer unit type (c). Another factor effecting the type of operation achieved by these units is the pressure of the fluid applied to the power nozzle relative to the width of the chamber. In the above examples, the types of operation described are achieved if the pressure of the fluid is less than 60 p.s.i. If, however, the pressure exceeds 80 p.s.i. the expansion of the fluid stream upon emerging from the main nozzle is sufficiently great to cause the stream to contact both sides walls of the chamber and lock on is prevented. Lock-on can be achieved at the higher pressures by increasing the widths of the chamber.

The present invention relates specifically to the utilization of continuously variable amplifiers; that is, amplifiers of class I. In systems of this type, the output signal is related by a proportionality factor to the input signal and it is desirable to eliminate boundary layer effects at least to the extent that they tend to produce operation as a class IIB or class IIC amplifier. As previously indicated, boundary layer effects may be completely eliminated or reduced to an acceptable value by maintaining the proper pressure in the interaction fluid chamber, by setting back the side walls a great distance from the power stream, by having the side walls diverge outwardly from the nozzle, or by a combination of these. In any case, the controlling criterion for design of an amplifier unit as a proportional amplifier is to insure that under no operating circumstances will an appreciable fraction of a side wall be disposed in close proximity to a high velocity portion of the streams.

In the systems with which the present invention is concerned, fluid signals are developed indicative of the orientation of a vehicle relative to a specific axis. In the single embodiment illustrated, passages extend from opposite sides of the fuselage of an aircraft so that the differential in fluid flows in the passages is a function of rotation of the craft about its vertical axis; i.e. the yaw of the craft. The passages are connected to opposed control nozzles of a fluid amplifier and the output passages thereof direct fluid into the ambient atmosphere at locations greatly removed from the yaw axis so as to create a large turning movement of the craft. The turning movement thus created is of such a sense as to tend to reduce the differential in signals supplied to the opposed control nozzles.

The above and still further objects, features and advantages of the present invention will become apparent upon consideration of the following detailed description of one specific embodiment thereof, especially when taken in conjunction with the accompanying drawings, wherein:

FIG. 1 is a plan view of a fluid-operated system in accordance with the principles of this invention.

FIG. 1a is an end view of the system shown in FIG. 1 with means for applying fluid to the system.

FIG. 2 is a plan view of another embodiment of the system shown in FIG. 1.

FIG. 2a is an end view of the embodiment of FIG. 2 with means for applying fluid to the system.

FIGS. 3 and 3a show a stacking arrangement for a pair of fluid-operated systems shown in FIGS. 2 and 2a.

Figure 4:
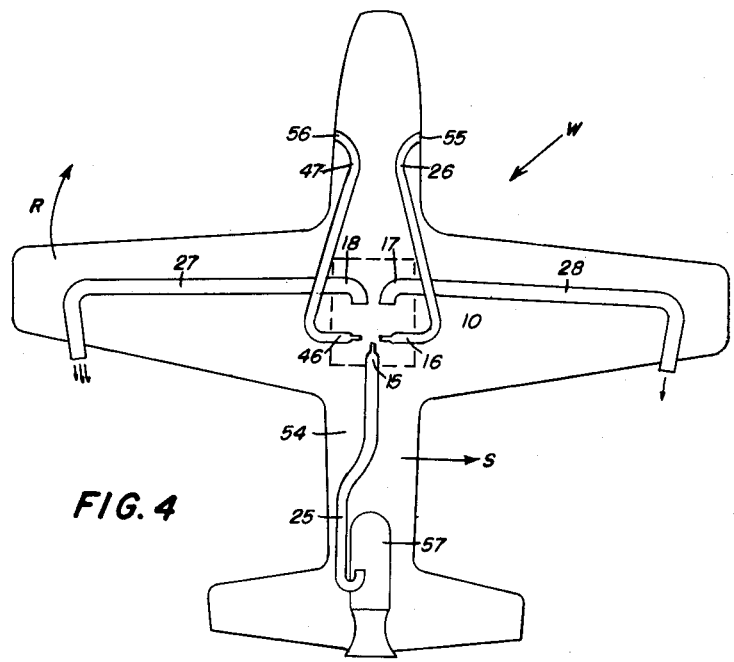

FIG. 4 schematically illustrates another arrangement for utilizing the system shown in FIGS. 2 and 2a.

The fluid-operated system 10 of this invention consists basically of a power nozzle through which a fluid, for example, compressed air from a suitable source, passes; a control nozzle through which fluid under pressure can flow and impinge upon the fluid issuing from the power nozzle; and two or more apertures for receiving the fluid from the power nozzle. The apertures, power nozzle and control nozzle are positioned such that when the fluid from the control nozzle impinges upon the fluid issuing from the power nozzle, the apertures will receive varying amounts or proportions of fluid depending upon the quantity and velocity of the fluid issuing from the control nozzle. Suitable means are connected to the apertures and the functioning of these means is based upon variations in proportions of fluid flow into the apertures.

FIGS. 1 and 1a illustrate one embodiment of the fluid-operated system of this invention. The fluid-operated system referred to by numeral 10 is formed by three flat plates 11, 12, and 13 respectively. Plate 13 is positioned between plates 11 and 12 and is tightly sealed between these two plates by machine screws 14. Plates 11, 12 and 13 may be composed of any metallic, plastic, ceramic or other suitable material. For purposes of illustration, plates 11, 12 and 13 are shown composed of a clear plastic material.

The substantially Y-shaped configuration cut from plate 13 provides a fluid supply nozzle 15, a control nozzle 16, and apertures 17 and 18. Nozzle 15 and nozzle 16 are adjacent to each other and are at substantially right angles. Nozzles 15 and 16 form constricted throats 15a and 16a, respectively. The input ends 15b and 16b of nozzles 15 and 16 communicate with bores 20 and 21, respectively, formed in plate 12. The output ends 17b and 18b of apertures 17 and 18, respectively, communicate with bores 22 and 23, respectively, in plate 12. Orifices 17a and 18a form openings for apertures 17 and 18, respectively, and are symmetrically spaced relative to nozzle 15. Both orifices 17a and 18a have identical cross-sectional areas in this embodiment.

Bores 20, 21, 22 and 23 are internally threaded so that tubes 25, 26, 27 and 28 which are externally threaded can be tightly held in their respective bores. The end of tube 25 extending from plate 12 is attached to a source of fluid under pressure. This source is designated by numeral 31. The fluid under pressure can be air or other gas, or water or other liquid. Gas with or without solid or liquid particles has been found to work very satisfactorily in system 10, also the liquid may have solid particles or gas bubbles therein. A fluid-regulating valve 62 may also be used in conjunction with source 31 to insure continuous flow of fluid at a constant pressure. Such fluid-regulating valves are, of course, conventional.

Since the fluid stream flowing from nozzle 15 is reduced in cross-sectional area by the nozzle throat 15a, the velocity of the fluid increases. Relatively small fluid pressures applied to nozzle 16 causes a jet to form which impinges at right angles to the jet exiting from nozzle 15. This impingement will cause considerable displacement of the jet stream from the latter nozzle as it passes nozzle throat 16a and the principle can be termed "momentum exchange," since the control jet from nozzle 16 imparts momentum to the jet from nozzle 15. When nozzle 16 does not apply fluid pressure against the jet issuing from nozzle 15, orifices 17a and 18a will receive equal proportions or quantities of fluid. Thus the proportions of fluid flow from tubes 27 and 28 will be equal and constant. A relatively small fluid pressure applied to the stream issuing from nozzle 15 by the jet from nozzle 16 will cause aperture 18 to receive a much larger proportion or quantity of fluid. This is because the jet from nozzle 15 can be substantially deviated as it passes nozzle throat 16a. Thtis "momentum exchange" principle is utilized by the present invention so that system 10 is capable of performing the functions of multiplication and amplification. It can be seen that small variations in fluid pressure applied to nozzle 16 cause large variations in fluid pressure in tubes 27 and 28. Thus the system 10 10 is capable of amplifying small pressure variations in tube 26.

FIGS. 2 and 2a illustrate a modification of the fluid-operated system shown by FIGS. 1 and 1a. This modification is designated by numeral 10a. In system 10a a second control nozzle 46 is positioned opposite the control nozzle 16. Throats 16a and 46a are substantially of the same size and shape. Input end 46b of nozzle 46 communicates with tube 47 threadedly fixed in bore 48. Numeral 50, like numeral 33, represents any means which would cause a fluctuating fluid pressure. Fluid-regulating valve 62 insures that the system 10a receives constant quantities of fluid.

Since throats 16a and 46a are in opposed relationship, variation in fluid pressure in either nozzle will cause amplified movement of the jet issuing from nozzle 15 in accord with the "momentum exchange" principle. If both nozzles 16 and 46 simultaneously receive fluid pressure, the resultant movement of the jet from nozzle 15 will depend upon the difference between the magnitude of the two opposing fluid streams from nozzles 16 and 46. Also, should one control nozzle be under a vacuum, the resultant effect upon the jet from power nozzle 15 will be the difference between the two pressures. Thus, it can be seen that the resultant fluid pressure difference causes movement of the stream from nozzle 15.

The above-described feature which amplifies the difference of two pressures from any two sources is utilized as shown in FIG. 4 as a yaw control for a jet airplane. FIG. 4 shows jet airplane 54 which is beginning to yaw or sideslip in the direction of arrow S so that the oncoming air approaches the airplane in the direction of arrow W. Tubes 26 and 47 extend from parts 55 and 56 respectively, adjacent the nose of the plane, as shown. Movement of plane 54 through the air produces air pressure in tubes 26 and 47. Tube 25 communicates with jet chamber 57 so that nozzle 15 will issue a continuous stream of gas under pressure. Wind pressure acting in the direction of arrow W will cause an increase in air pressure in tube 26 with the result that the pressure in tube 26 is greater than the pressure in tube 47. Nozzle 16 will thereupon issue a jet at higher pressure than that jet issuing from nozzle 46. As a result, the fluid from nozzle 15 will be moved a larger proportional amount into aperture 18. The greater air pressure issuing from tube 27 will cause a greater reactive force than that produced by tube 28 causing jet airplane 54 to turn about its center of gravity in the direction of arrow R thereby aligning airplane 54 so that it heads directly into the wind.

FIGS. 3 and 3a illustrate another embodiment of the present invention. In these figures, two identical fluid-operated system 10a shown in FIGS. 2 and 2a are stacked on top of one another so that differential air pressures in tubes 27 and 28 can be amplified again.

This can be easily effected by merely connecting tubes 27 and 28 by means of suitable sleeves 61 to control nozzles 16' and 46'. Source 31' is identical to source 31 so that the power nozzle 15' can receive continuous air pressure. Air introduced into nozzles 16' and 46' will be amplified again and will issue from tubes 27' and 28' respectively. The amplified variations in air pressure in tubes 27' and 28' can be utilized to move expansible bellows, diaphragms, pistons or other fluid responsive mechanisms, as will be evident to those skilled in the art. If so desired, further amplification can be effected by adding additional systems 10a to the stacking arrangement shown in FIG. 3. In summary, this invention provides a fluid-operated system which has no moving parts and which performs functions hitherto performed by electronic or complex mechanical devices. The fluid stream issuing from power nozzle 15 and the impinging streams from the control nozzles and apertures 17 and 18 perform in a manner similarly to a stream of electrons.

The specific amplifiers illustrated in FIGURES 1, 2, and 3 are all proportional amplifiers of the class I type as defined hereinabove. In FIGURE 1 the apex of the divider separating channels 17 and 18 is located a distance from the outlet of the power nozzle 15a equal to approximately 2½ times the width of the power nozzle. When the divider is so placed, and with the angle of divergence of the side walls of the unit about as illustrated in FIGURE 1, lock-on is inhibited. In this unit, the power stream is restricted in the N direction; that is, in the direction normal to the plane of FIGURE 1.

The gain of the device of FIGURE 1 is not great since, as indicated hereinabove, the angle through which the stream must be deflected to produce a substantial change in the energy delivered to an output passage, such as 17 or 18, is large and therefore the power of the control stream issuing from nozzle 16 must be relatively large. However, gain is achieved by this unit due to the fact that the integrity of the stream is retained as the power stream passes through the chamber, so that the power stream can deliver greater power to the output channel than is required to deflect the power stream.

Referring now specifically to FIGURE 2 of the accompanying drawings, there is provided a unit which operates as a proportional amplifier, like FIGURE 1, but has a greater gain. Specifically, in the unit of FIGURE 2, the divider is displaced approximately four widths of the power nozzle from the end of the power nozzle, whereas in FIGURE 1 the displacement is 2½ widths. Consequently, the angle of deflection of the power stream required to produce a predetermined variation in an output parameter at one of the output passages 17 and 18, in FIGURE 2 is less than the angle required to produce a corresponding change in the output passages in the unit of FIGURE 1. The required input control power is thus reduced. In FIGURE 2, as in FIGURE 1, the apparatus has some boundary layer effects, but these effects are not dominant because of the large angle of divergence of the side walls relative to the axis of the power nozzle. Lock-on may also be prevented by a combination of a large setback of the side walls and an appropriate angle of divergence of the side walls.

In both of the units of FIGURES 1 and 2, the stream initially divides equally between output passages 17 and 18 and therefore a push-pull output signal is derived across the output passages and a push-pull-actuated load device may be connected across tubes 27 and 28. As indicated hereinabove, this type of arrangement improves efficiency and, under some conditions, increases power gain in that the deflection of the power stream adds to the power delivered to one end of the load device while subtracting an equal amount of power from the other end of the load device. Therefore a two-fold or push-pull effect is achieved.

The apparatus of FIGURE 3 illustrates the cascaded amplifier employing substantially two amplifiers of the type illustrated in FIGURE 2, and it is intended to emphasize the fact that these units may be cascaded and connected serially, and that the load device mentioned may be another fluid amplifier.

The efficiency and gain of the units of FIGURES 1 through 3 is, under some flow and load conditions, maximized by having the stream divide equally, in the absence of a control signal, between the output passages. It is not intended to limit the structure of the invention to such an arrangement, and it is possible by employing a lock-on technique to cause an unbalanced initial flow. This unbalance can be provided by positioning the flow divider asymmetrically, by bleeding a small amount of fluid into one of the control nozzles from the power nozzle, or by supplying to one of the control nozzles fluid under pressure from an external source of fluid under pressure. This unbalance may also be provided by employing the boundary-layer lock-on principles described by R. E. Bowles and R. W. Warren in their copending application referred to hereinabove. The placement of the divider is optional, and it may be located so as to provide any desired initial proportioning of the fluid between the apertures, or passages.

Each of the various types of load device requires a different type of fluid amplifier, as previously indicated. Specifically, a pressure load requires that each output passage be relatively small compared to the width of the power stream; a mass flow load requires that each output passage be approximately as large as the power stream; and a power amplifier requires that each output passage be intermediate in size between these, say ¼ to ¾ the width of the power stream. For maximum efficiency and output power the output passages should be approximately the same width as the high velocity center portion of the power stream. For maximum power gain the output passages should be considerably narrower than the high velocity center portion of the power stream. A good compromise which gives a good power gain and good efficiency can be made by making the output passages approximately half the width of the high velocity portion of the power stream.

While I have employed, in the various arrangements shown in the accompanying drawings, power nozzles and control nozzles oriented at substantially right angles to each other in order to illustrate a means of achieving a high gain, it is clear that other angles than right angles may be used. When an angle other than a right angle is used between the power stream and its control stream, the deflection of the power stream will be determined by the component of the control stream momentum which is at a right angle to the power stream, i.e., by the component of the force of the control stream which is directed transversely of the power stream.

While I have described and illustrated one specific embodiment of my invention, it will be clear that variations of the details of construction which are specifically illustrated and described may be resorted to without departing from the true spirit and scope of the invention as defined in the appended claims.

I claim:

1. In a system of aircraft control, a fluid amplifier including a first and a second output channel, first and second control nozzles and a power nozzle, means for supplying fluid under pressure to said power nozzle, means for deriving fluid control signal for said first and second control nozzles, said last means including sensors of attitude error of said aircraft, said output channels being arranged selectively to eject fluid in attitude error correcting relation to said aircraft, said control nozzles being arranged to control flow of fluid from said power nozzle to said output channels selectively as a function of fluid flow from said control nozzles.

2. In a system of aircraft control, a fluid amplifier including a first and a second output channel, first and second control nozzles and a power nozzle, means for supplying fluid under pressure to said power nozzle, means for deriving fluid control signals for said first and second control nozzles, said last means including sensors of attitude error of said aircraft, said output channels being arranged selectively to eject fluid in attitude error correcting relation to said aircraft, said control nozzles being arranged to control flow of fluid from said power nozzles to said output channels selectively as a function of fluid flow from said control nozzles.

3. A control system for utilizing the exhaust gases of a jet engine or the like for the directional control of an aircraft embodying the jet engine comprising a fluid amplifier including a power nozzle and at least one control nozzle angularly disposed with respect to each other for issuing interacting fluid streams, means connecting said power nozzle to receive fluid from the jet engine of the aircraft, means for supplying a correctional control fluid signal to the control nozzle in response to deviation in the flight course of the aircraft, and plural output passages for receiving the displaced power stream resulting from the interaction between the power and control streams, said passages being constructed and arranged to issue fluid jets in a direction counter to change of direction of the aircraft.

4. A system of vehicle control comprising a pure fluid amplifier having means for issuing a stream of fluid, at least one output channel positioned to receive said stream of fluid, and a control nozzle for issuing fluid such as to develop a differential pressure across said stream of fluid to deflect said stream and thereby vary the proportion of said stream received by said output channel as a function of fluid issued by said control nozzle; means for developing fluid signals which are a function of the deviation of the vehicle from a desired orientation in its fluid medium; means for applying said fluid signals to said control nozzle; orientation control means for said vehicle; and means for supplying to said orientation control means fluid signals developed in said output channel of said pure fluid amplifier in such a sense as to reduce the deviation of the vehicle from its desired orientation.

5. A system of aircraft control comprising a pure fluid amplifier including means for issuing a stream of fluid, a pair of output channels positioned in fluid intercepting relationship relative to said stream of fluid, a control means for developing a differential in pressure across said stream of fluid to deflect said stream and thereby vary differentially the relative proportions of the stream received by said output channels; means for developing fluid signals which are a function of the deviation of the vehicle from a desired orientation in its fluid medium; means for applying said fluid signals to said control means; orientation control means for said vehicle; and means for supplying to said orientation control means fluid signals developed in said output channels of said pure fluid amplifier in such a sense as to reduce the deviation of the vehicle from its desired orientation.

6. The combination according to claim 4 wherein said orientation of the vehicle is its attitude and wherein said means for developing a fluid signals is an attitude sensing means.

7. The combination according to claim 4 wherein the orientation to be controlled is the angular displacement of the vehicle about one of its rotational axes, wherein said orientation control means comprises a pair of passages which exhaust into the fluid medium, and wherein said passages are disposed relative to said axis to produce opposite rotation of the vehicle about said axis upon issuance of fluid therefrom.

8. The combination according to claim 4 wherein said pure fluid amplifier comprises a pair of control nozzles disposed on opposite sides of said stream of fluid; wherein said means for developing fluid signals generates a pair of differentially related fluid signals and wherein said means for applying applies each of said pair of fluid signals to a different one of said control nozzles.

9. The combination according to claim 4 further comprising means for supplying a small portion of the gases developed by the engine of the vehicle to said means for issuing a stream of fluid.

References Cited in the file of this patent

UNITED STATES PATENTS

| 612,808 | Smith | Oct. 18, 1898 |
| 1,763,590 | Klemperer | June 10, 1930 |
| 2,176,807 | Wunsch | Oct. 17, 1939 |
| 3,027,121 | Griswold | Mar. 27, 1962 |

FOREIGN PATENTS

| 421,257 | France | Dec. 16, 1910 |